United States Patent [19]
Carlsen et al.

[11] Patent Number: 5,730,491
[45] Date of Patent: Mar. 24, 1998

[54] NON-ROTATIONAL ASHTRAY FOR AN AUTOMOTIVE CONSOLE

[75] Inventors: Patrick J. Carlsen, St. Clair Shores; Daniel E. Hawkins, Milford, both of Mich.

[73] Assignee: Lear Corporation, Southfield, Mich.

[21] Appl. No.: 661,153

[22] Filed: Jun. 10, 1996

[51] Int. Cl.$^6$ .................................................... B60N 2/46
[52] U.S. Cl. ............................ 297/188.19; 297/188.14
[58] Field of Search .................. 297/188.08, 188.09, 297/188.1, 188.13, 188.14, 188.19; 248/311.2

[56] References Cited

U.S. PATENT DOCUMENTS

| | | | |
|---|---|---|---|
| 5,037,157 | 8/1991 | Wain et al. | 297/188.09 X |
| 5,131,716 | 7/1992 | Kwasnik et al. | 297/188.19 X |
| 5,390,976 | 2/1995 | Doughty et al. | 297/115 |
| 5,489,054 | 2/1996 | Schiff | 297/188.14 X |
| 5,556,017 | 9/1996 | Troy | 297/188.14 X |
| 5,562,331 | 10/1996 | Spykerman et al. | 297/188.19 X |

*Primary Examiner*—Peter R. Brown
*Attorney, Agent, or Firm*—Brooks & Kushman P.C.

[57] ABSTRACT

A non-rotatable ashtray for use with a console assembly adapted to be located between the front passenger seat and the driver seat of an automotive vehicle, the console being convertible to provide alternately an auxiliary seat for a third front passenger, and an armrest for the front seat passenger and the vehicle driver, the console including a lower portion that may be tilted forwardly to expose a storage bin and an ashtray situated on a stationary housing portion for the console and an ashtray cover that is adapted to be rotated about a fixed axis to a closed position upon rotation of the lower console portion to the position it assumes when the console functions as an armrest.

3 Claims, 11 Drawing Sheets

NON-ROTATIONAL ASHTRAY FOR AN AUTOMOTIVE CONSOLE

TECHNICAL FIELD

This invention relates to an ashtray assembly for a front passenger seat and driver seat of an automotive vehicle passenger compartment.

BACKGROUND OF THE INVENTION

My invention comprises improvements in a console assembly of the type disclosed in co-pending patent application Ser. No. 08/664,202 filed Jun. 10, 1996 entitled Console Assembly For An Automotive Vehicle Combining Armrest, Article Receiving Tray And Auxiliary Seat Features. This co-pending patent application is assigned to the assignee of this invention.

Disclosed in the co-pending application is a compound console assembly having a lower seat portion and an upright seat portion, which together define an auxiliary seat between the front passenger seat and the driver seat of an automotive vehicle. The lower console portion may be pivoted forwardly to expose an audiotape cassette storage bin and beverage cup retainer pockets. When it is in that forward position, a stationary ashtray assembly is exposed so that it may be conveniently accessed by the front passenger and the driver.

BRIEF DESCRIPTION OF THE INVENTION

The present invention comprises an improved ashtray assembly for use with the console disclosed in the co-pending disclosure mentioned above.

The ashtray assembly is fixed to a stationary console housing. It includes a rotary cover that may be rotated in one direction to overlie stationary portions of the ashtray assembly and pivoted forwardly to open the ashtray assembly when it is in use. The lower console portion, when it is pivoted in a rearward direction to the position it assumes when it function as an auxiliary seat, will engage the rotary cover for the ashtray assembly thereby ensuring that the ashtray assembly will be covered when the auxiliary seat is positioned for use. This does not require the driver to close the ashtray prior to movement of the lower console portion to the auxiliary seat position. This avoids a distraction of the vehicle operator from his driver responsibilities during highway driving.

Movement of the ashtray cover from the open position to the closed position is effected by an over center spring which will cause the ashtray cover to move with a snap action to its closed position when it is adjusted by the lower console portion to an over-center position.

BRIEF DESCRIPTION OF THE DRAWINGS

FIG. 5a–b is an isometric view of a padded seat portion that forms a part of the console assembly with which the structure of FIG. 5 is assembled;

FIGS. 13, 14, 15 and 16 show various angular positions of the lower seat portion of the auxiliary seat assembly with an ashtray that cooperates with it to effect an automatic closure.

DESCRIPTION OF PREFERRED EMBODIMENT

Figure 1:
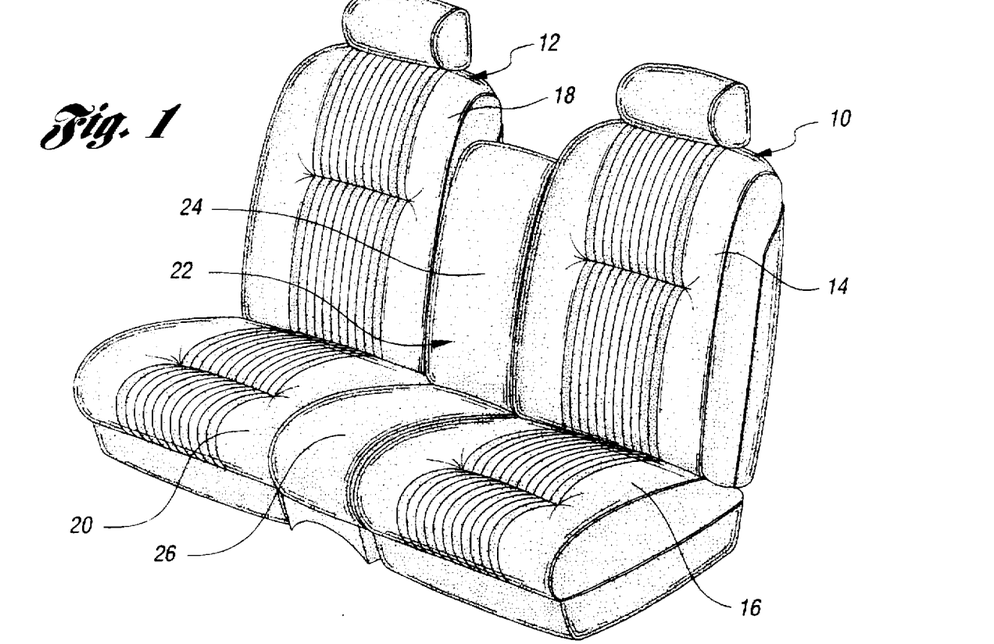
FIG. 1 is a three-quarter perspective assembly view showing a driver seat and a front passenger seat with a console assembly disposed between them, and with an upright seatback portion tilted forwardly to define an armrest.

FIG. 1 shows a front seat assembly for an automotive passenger vehicle. It includes a driver seat 10, a passenger seat 12. The driver seat 10 includes an upright seatback portion 14 and a horizontal seat portion 16. Similarly, the passenger seat 12 includes an upright seat portion 18 and a horizontal seat portion 20.

Located between the seat 10 and the seat 12 is a console assembly generally identified by reference numeral 22. It includes an upper portion 24 and a lower portion 26. The upper portion can be pivoted at its base to the upright position shown in FIG. 1, thereby providing a seatback for an auxiliary seat assembly while the lower portion 26 provides a horizontal seat portion of the auxiliary seat assembly.

Figure 2:
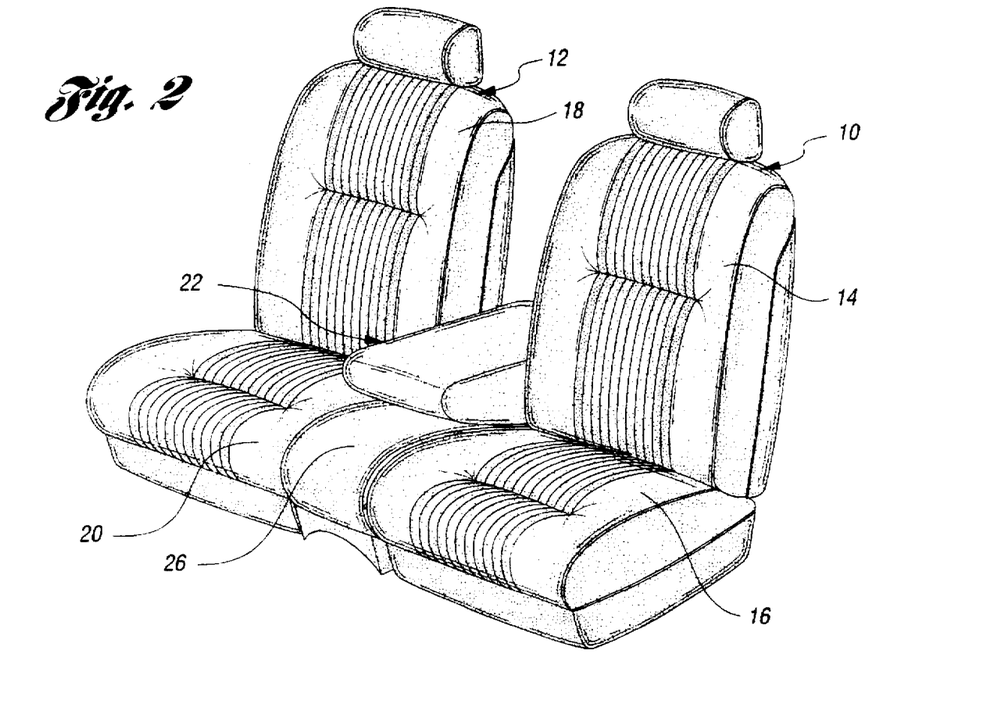
FIG. 2 shows the assembly of FIG. 1 with the seat back portion tilted upwardly.

FIG. 2 shows the lower console portion folded down to its auxiliary seat position and the upper portion folded down to an armrest position. When the upper portion 24 is in the position shown in FIG. 2, it provides an armrest for the driver or the front seat passenger.

Figure 3:
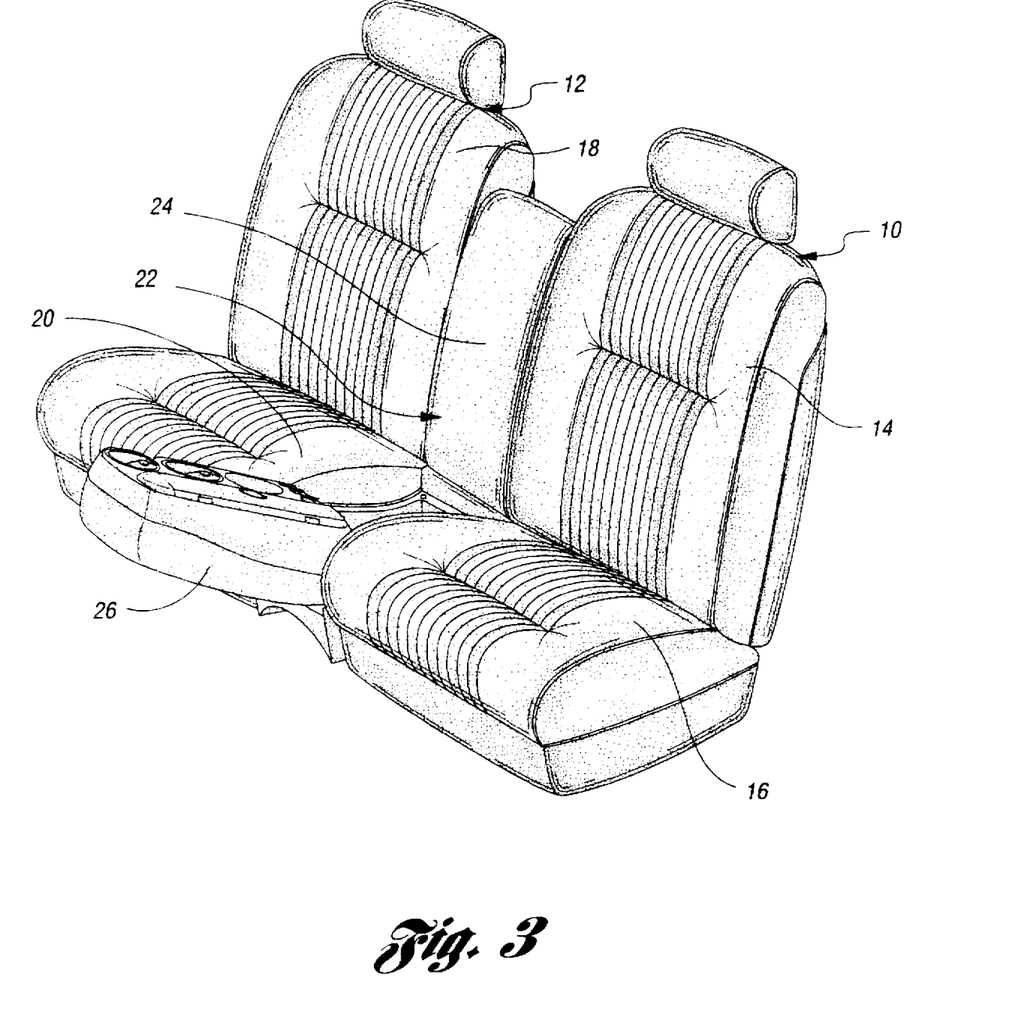
FIG. 3 shows a portion of the console assembly of FIGS. 1 and 2 with the lower portion of the assembly tilted forwardly about its axis thereby making the beverage cup retainer and cassette storage bin accessible to the driver and the front seat passenger.

FIG. 3 shows the lower console portion 26 pivoted outwardly so that the under surface of the portion 26, when it is positioned as shown in FIG. 2, becomes the upper surface when it is pivoted outwardly thereby making accessible to the driver and the front seat passenger beverage cup retainer recesses and a storage bin which is adapted particularly to store audio cassettes. This will be described with reference to FIGS. 4 through 4e.

Figures 5, 5B:
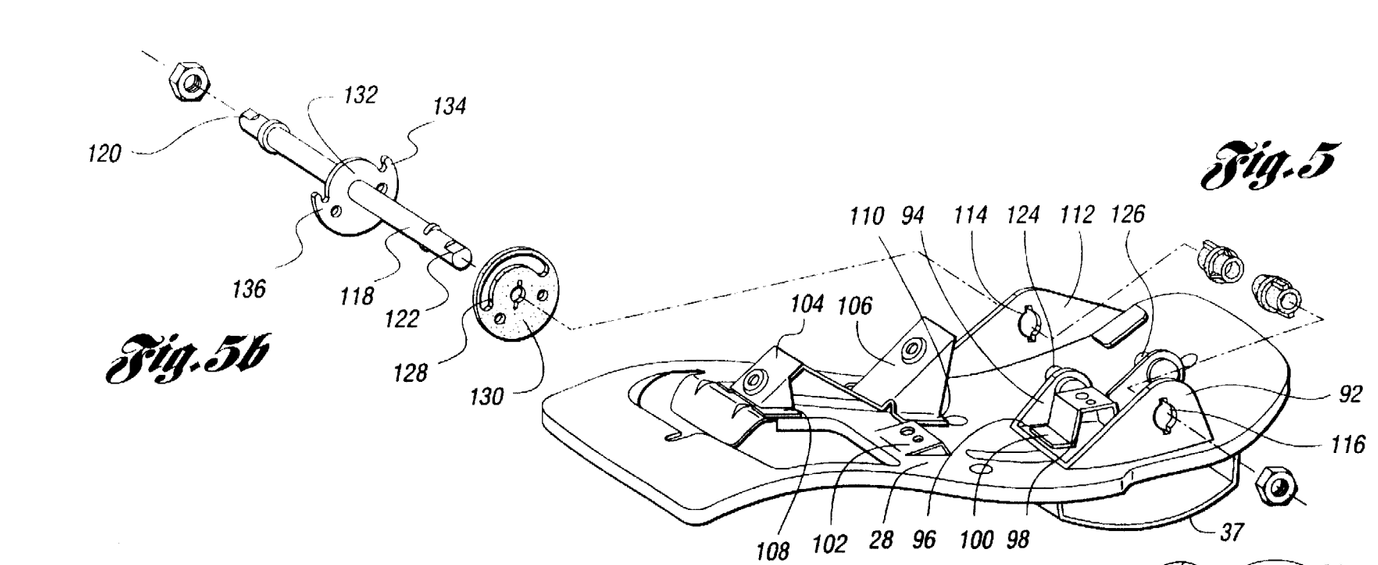
FIG. 5 is an isometric view of a metallic support for the polyvinyl storage bin and beverage cup retainer portion of FIG. 4.

The lower console portion comprises a structural steel platform or base 28. By preference, it is generally S-shaped in the fore-and-aft direction. FIG. 5 shows the structural base 28 as it would appear when the lower portion is pivoted to its outward position as shown in FIG. 3.

Figure 5A:
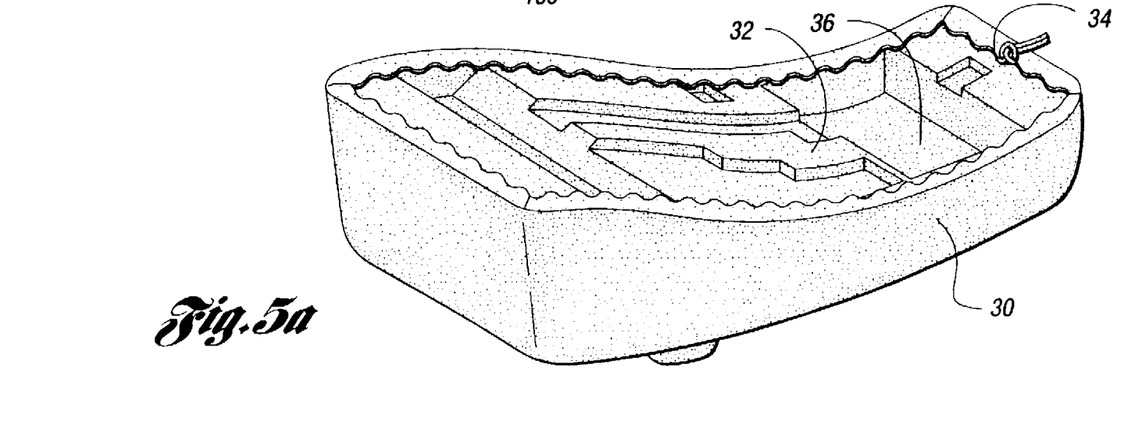

A seat cushion part of the lower portion 28 is shown in FIG. 5a at 30. It comprises an inner rigid structural reinforcing core or skeleton 32 about which a cushion envelope is attached. By preference, the margin of the cushion can be secured to the skeleton 32 by nylon cords 34 or any similar retainer device. The inner structural core or skeleton includes a cavity 36, which is adapted to receive a bracket portion 37 which may be spot welded to the underside of the support 28 as shown in FIG. 5. This provides a clearance for an ashtray and for bracket structure that will be used with the pivot rod for the support 28, as will be described with reference to FIGS. 5b and 6. The ashtray construction, however, is not a part of the present invention and will not be particularly disclosed.

Figures 4, 4B, 4C, 4D:
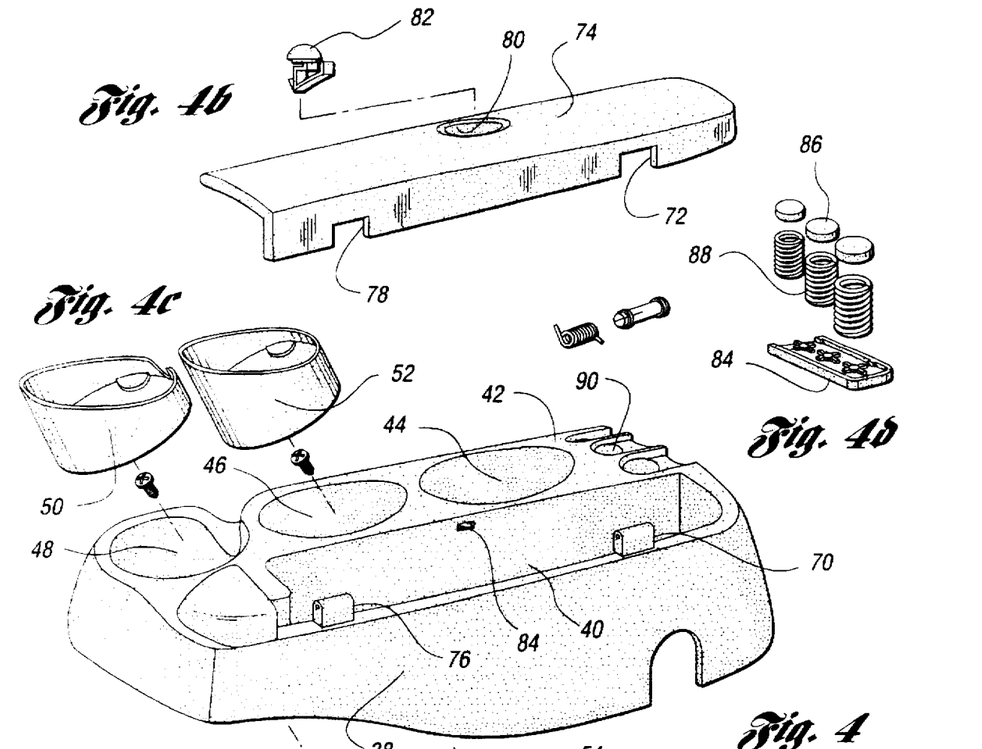
FIGS. 4, 4a, 4b and 4c show an exploded assembly view of a polyvinyl plastic portion of the console assembly of my invention including a storage bin and three beverage cup retainer pockets.
FIG. 4d is an exploded view showing the details of a coin cartridge assembly, which forms a part of the plastic console portion of FIG. 4.

The polyvinyl plastic shell shown in FIG. 4 comprises a peripheral wall 38. The shell is a one piece integral molding with an elongated opening 40 and an upper planar section 42 in which openings 44, 46 and 48 are formed during the molding process. A liner 50 of generally cylindrical shape is inserted into the opening 48 and a corresponding liner 52 is received in opening 46. By preference, the opening 44 is formed with an internal wall and an internal base during the molding operation as part of the horizontal planar section 42.

Figures 4A, 4E:
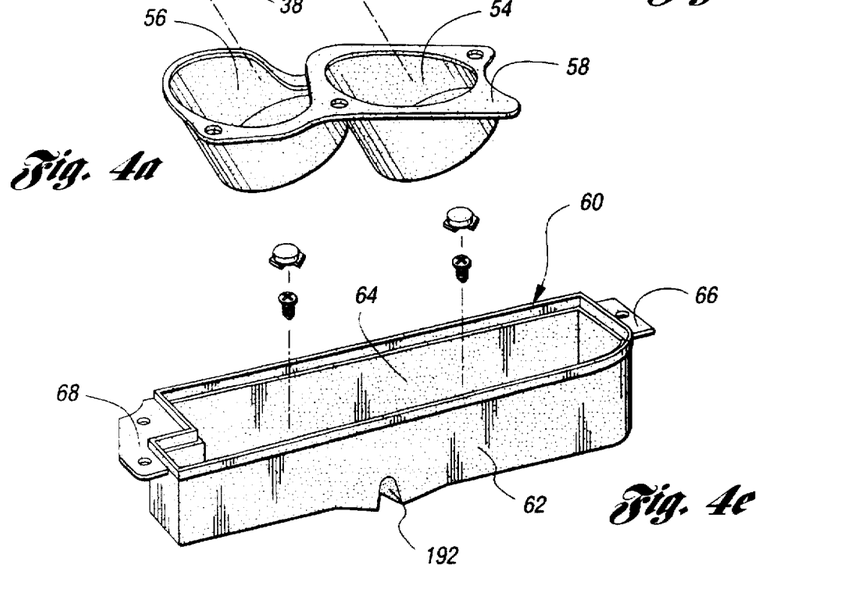
FIG. 4e is a detailed view of a cassette storage bin shell.

FIG. 4a shows a separate molding that defines a part of the openings 46 and 48. It comprises a generally cylindrical portion 54 and a corresponding cylindrical portion 56. These are adapted respectively to register with the liners 52 and 50. The molding, as shown in FIG. 4a, includes a flange 58 that may be pressure and heat welded to the underside of the planar section shown at 42.

FIG. 4e shows an insert that defines a storage bin generally shown at 60. It is of generally rectangular shape and it includes sidewalls 62 and 64. Insert 60 is provided with a flange 66 at one end and a flange 68 at the other end. These permit the insert 60 to be pressure heat welded to the underside of the unitary molding 38 thereby defining the opening 40 described with reference to FIG. 4.

One margin of the opening 40 in the unitary molding or shell shown in prior art 38 has a hinge projection 70 that is adapted to be received in hinge recess 72 formed in bin cover 74, as seen in FIG. 4b. A corresponding hinge projection 76 is adapted to be received in hinge opening 78 in the cover 74, as seen in FIG. 4b. Hinge pins are used to hinge the cover 74 on the projections 70 and 76 at the spaced hinge locations.

One margin of the cover is provided with an opening 80 to receive a latch 82, which is adapted to register with latch opening 84 in one wall of the storage bin as seen in FIG. 4 when the cover 74 is pivoted on its hinges to the closed position shown in FIG. 4b.

FIG. 4d shows a conventional coin holder which comprises a base 84 that may be pressure heat welded to the underside of the planar section 42 of the molding, as shown in FIG. 4. Pushbuttons 86 are urged by springs 88, thereby forcing coins to their uppermost positions in the openings 90 formed in the planar section 42 of the molding. The springs 88 are anchored on the base 84.

The structural frame 28, shown in FIG. 5, carries a support bracket having two vertical flanges 92 and 94. The base 96 of the bracket is welded to the upper surface of the support 28, as seen in FIG. 5. A secondary hat-shaped bracket 98 has flanges, as shown in 100, which are welded to the base 96 of the primary bracket. The bracket 98 is generally aligned in a fore-and-aft direction with a bracket 102 which is formed by displacing a portion of the support base 28. The hat-shaped bracket 98 and the bracket 102 have retainer screw openings that can accommodate a threaded fastener or some other suitable fastener for retaining the plastic shell 38 of FIG. 4 and the cushioned structure 32, as shown in FIG. 5a, in assembled relationship, one with respect to the other.

The steel support structure 28 is provided also with support brackets 104 and 106, which can be welded at flanges 108 and 110, respectively, to provide support for the beverage cup receptacle molding shown in FIG. 4a. Each bracket 104 and 106 is provided with an opening to accommodate a threaded fastener or some other suitable fastener for retaining the molding shown in FIG. 4a securely in place as part of the assembly that is supported by the base 28.

A flange 112, formed on one margin of the base 28, is provided with a shaft opening 114. A corresponding opening 116 is formed in the flange 92. A pivot shaft for the lower console portion is shown in FIG. 5b at 118. It extends through the openings 114 and 116 and may be locked in place at the ends 120 and 122 by a suitable fastening device such as a locknut. End 122 is locked in the opening 116 and end 120 is locked in the opening 114.

Bracket flange 94, as seen in FIG. 5, carries a pin which extends horizontally as indicated at 124. A second pin 126 also extends from the bracket flange 94 in a direction parallel to the pin 124. It is located in the same fore-and-aft plane as the pin 124.

Pin 124 is adapted to be received in opening 128 of a plastic guide plate 130, as seen in FIG. 5b. The opening 128 is arcuate with its center on the center of the shaft 118. Located directly adjacent the guide plate 130 is a steel plate 132 which acts as a stop for limiting the angular movement of the lower console portion about the axis of shaft 118. The steel plate includes two stop portions, seen at 134 and 136, which are arranged with respect to the shaft 118 so that they will engage pin 126 when the lower console portion is tilted to its limiting forward position and to its limiting position in the opposite direction. Both the steel plate 132 and the guide plate 130 are non-rotatably secured to the shaft.

Figure 6:
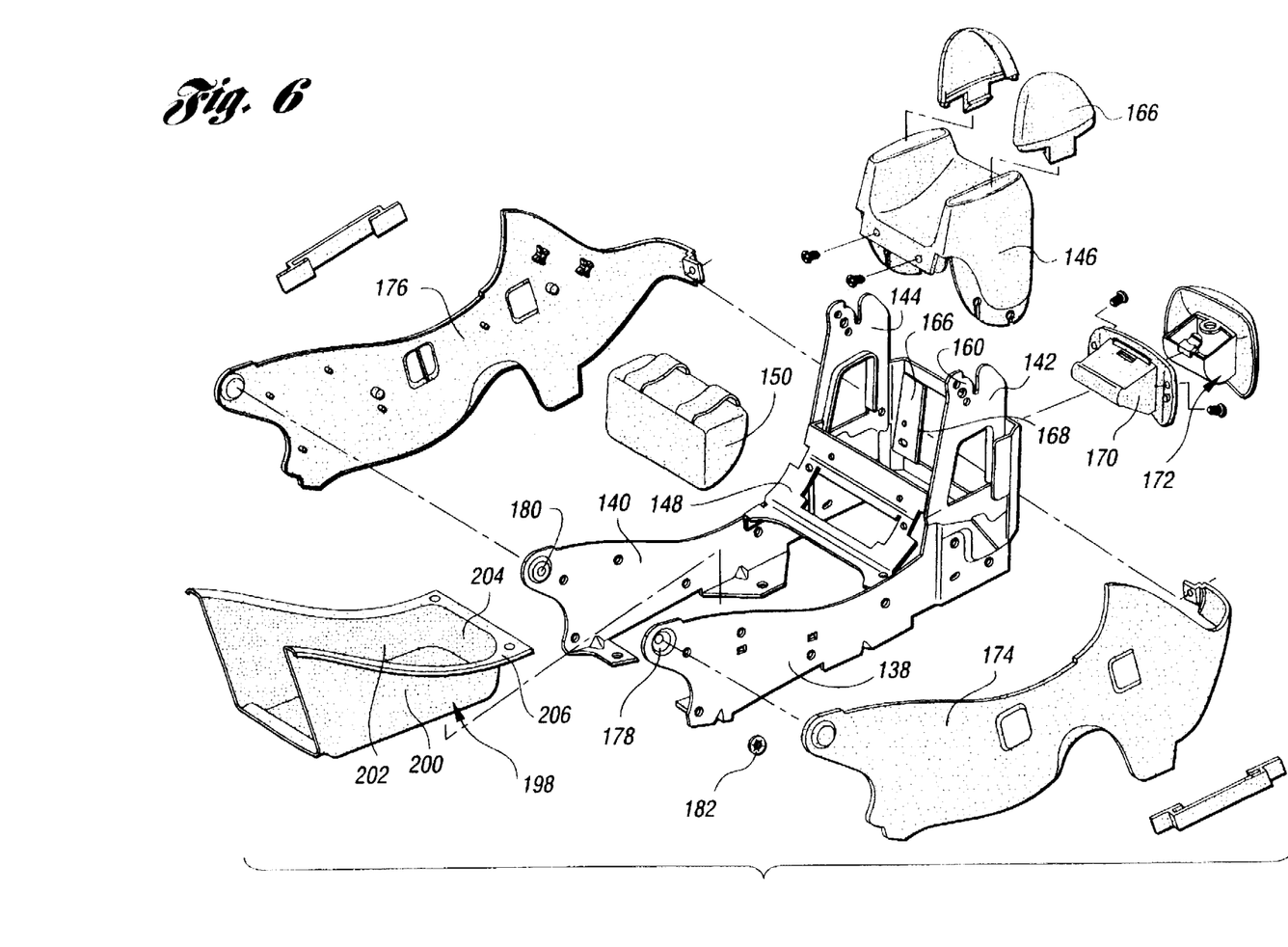
FIG. 6 is an exploded isometric assembly view of the structural portions of the console assembly including the housing on which the support structure of FIG. 5 is mounted.

The structural housing shown in FIG. 6 includes a first side wall 138 and a second side wall 140. The sidewalls 138 and 140 generally conform to the shape of the structural plate 128 of FIG. 5. The right hand ends of the sidewalls 138 and 140 project generally upwardly, as seen at 142 and 144. These upward projections are covered by a plastic covering 146.

The sidewalls 138 and 140 are joined at an intermediate location by structural bracket 148, preferably by spotwelding. The upper surface of the bracket 148 provides a base for supporting a cushion 150, which is located between the end 152 of the cushion 30, shown in FIG. 5a, and the base 154 of the upright seatback portion, as shown in FIG. 6a.

Figures 6A, 8:
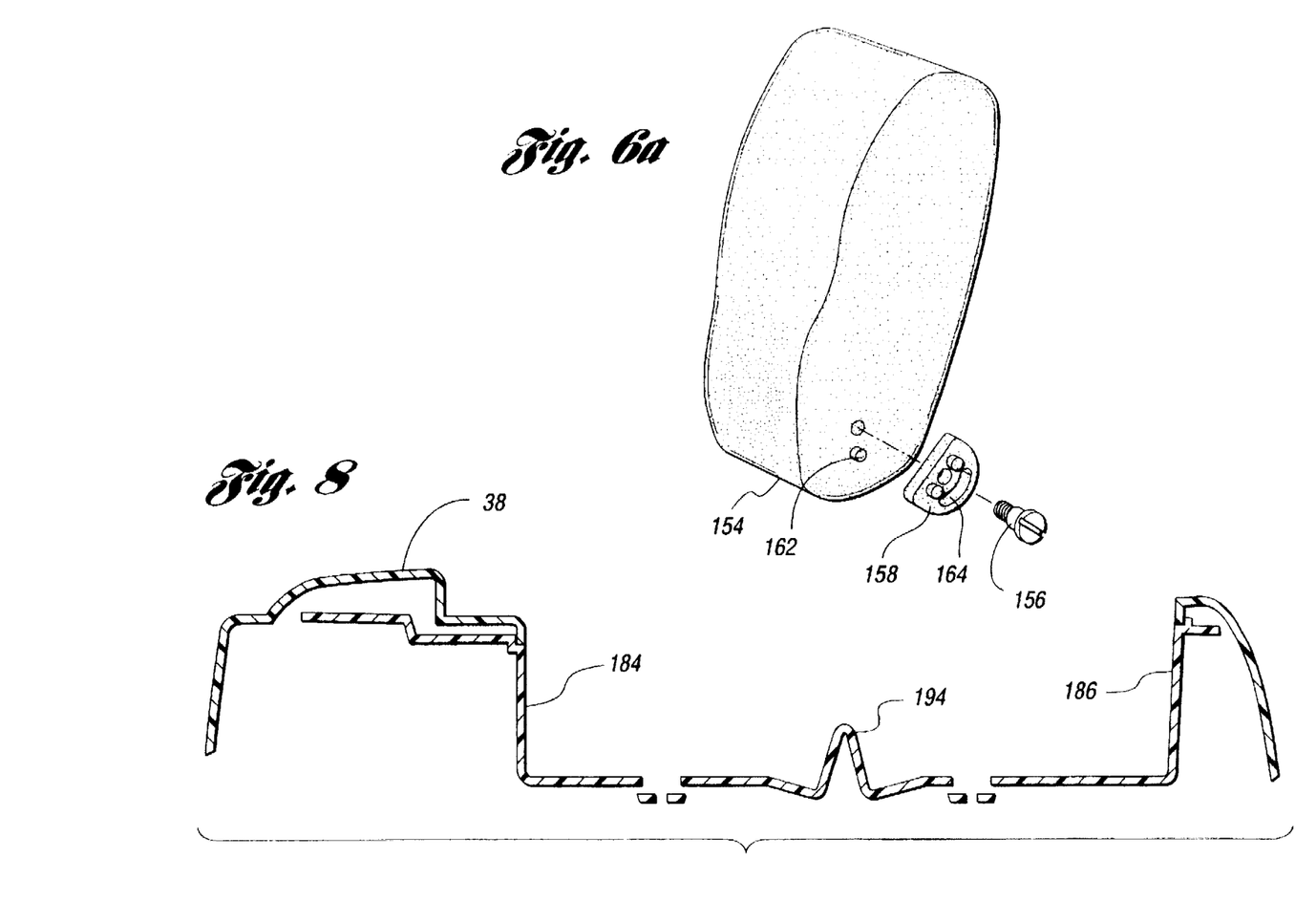
FIG. 6a is an isometric view of the upright seatback portion that can be pivoted from the position shown to a horizontal position.
FIG. 8 is a cross-sectional view taken along the plane of section line 8—8 of FIG. 7.
Figure 7:
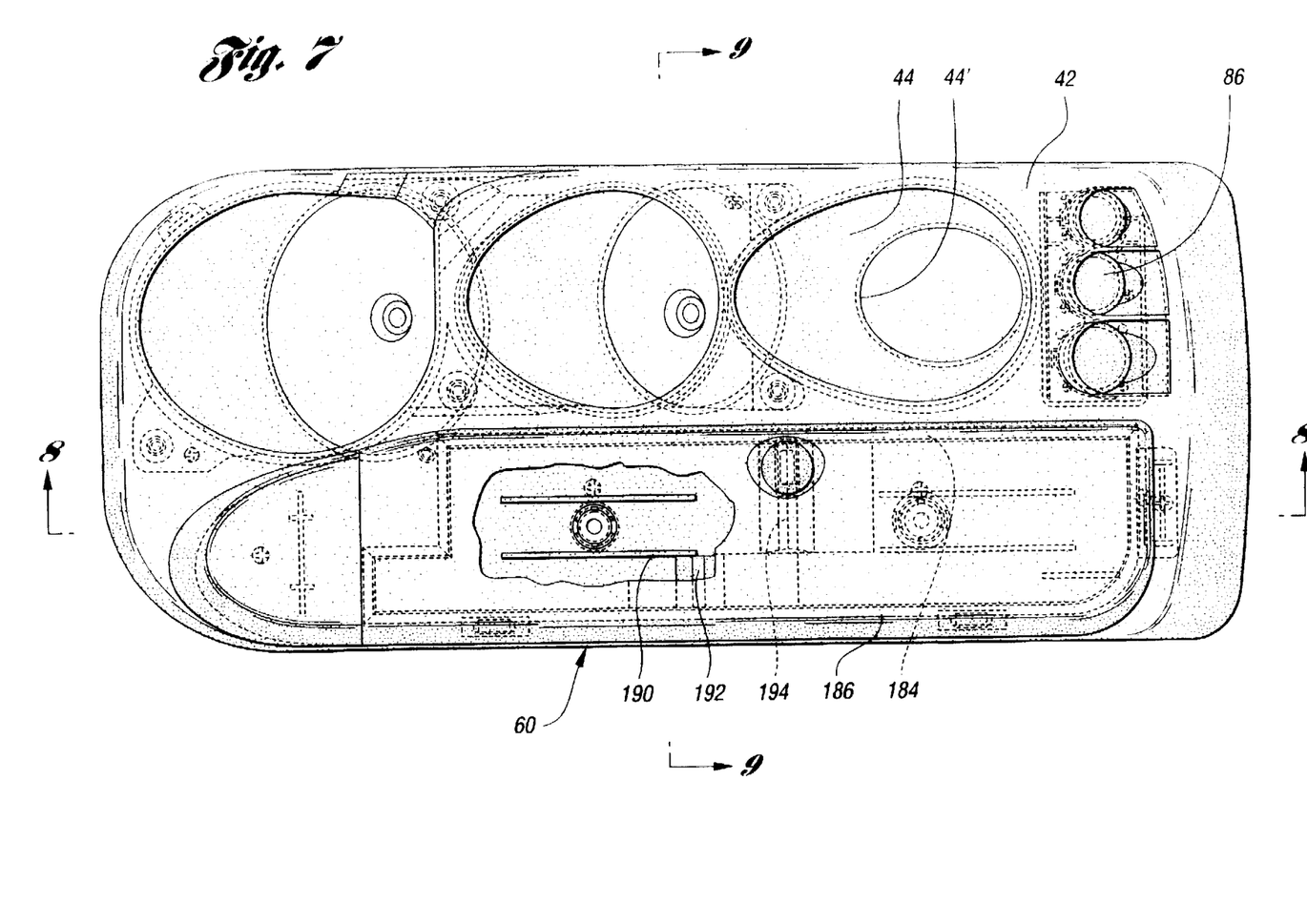
FIG. 7 is a planar view of the polyvinyl structure illustrated in FIG. 4.

The seatback portion, shown in FIG. 6a, is mounted pivotally on the upright portions 142 and 144 of the structural housing. Pivot pins 156 provide a pivot point for the upright seatback portion. It is received through an opening formed in mounting brackets, one of which is shown at 158 in FIG. 6a. The opening for the pin 156 in bracket 158 is aligned with opening 160 for the upright portion 142. A corresponding opening is formed in upright portion 144. A guide pin 162 is received in arcuate opening 164 of the bracket 158 to provide a stop for limiting the angular movement of the upright seat portion about the axis of the pins 156.

The top of the cover 146 has caps shown at 166, which cover the upper end of each upright portion 142 and 144.

The rearward end of the structural housing, as shown in FIG. 6, comprises a structural end plate 166 with an opening 168 for receiving a molded plastic ashtray insert 170. A steel ashtray and plastic cover assembly 172 register with the molding 170. The ashtray assembly 172 is accessible to the rear seat passengers in the vehicle.

The structural walls 138 and 140 are covered by a plastic covering 174 and 176, respectively.

The end 122 of the stationary shaft 118 is received in opening 178 formed in the side plate 138, and end 120 of the stationary shaft 118 is received in opening 180 in the side plate 140. A locknut 182 secures the shaft end 122 to the side plate 138.

Figure 9:
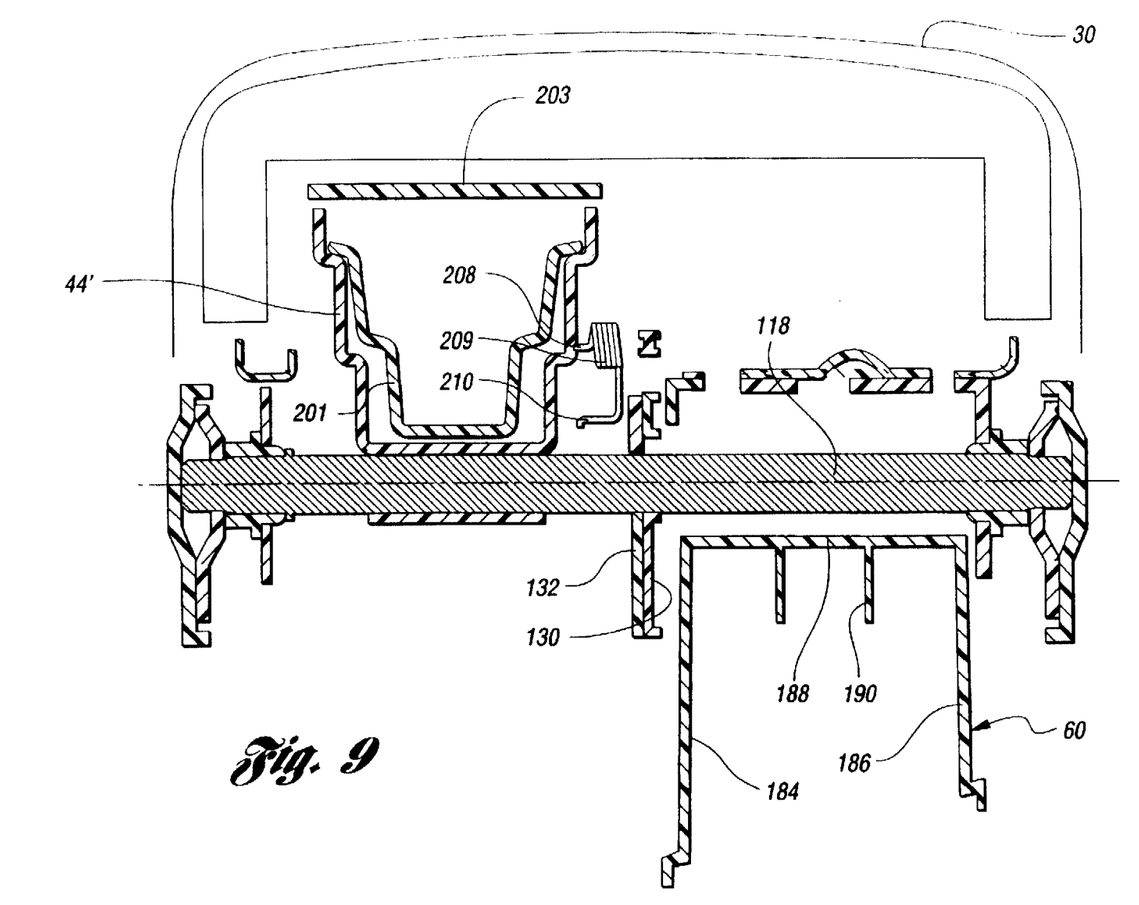
FIG. 9 is a cross-sectional view taken along the plane of section line 9—9 of FIG. 7.

FIG. 9 shows a transverse cross-sectional view across the lower console portion. It shows the cassette storage bin 60 in its inverted position, which is the position it assumes when the structural plate 28 with the cushion 30 is pivoted clockwise from the position shown in FIG. 5. The lateral sides of the bin 60 include sidewalls 184 and 186. The base of the storage bin, which is identified in FIG. 9 by reference numeral 188, has vertical spacers 190 which serve to position the cassettes when they are assembled in the bin so that they rest in generally vertical planes.

The base of the bin 60 is molded with an integral ridge 192, which is seen also in the isometric view of FIG. 4e. A corresponding ridge 194 is molded in the base of the bin adjacent the bin side 184.

When the cassettes are assembled in the bin in generally vertical planes in the spaces defined by the separator spaces 190, the rearmost edge of each cassette is anchored against one of the ridge 192 or 194. This permits the occupant of the driver seat or the passenger seat to tilt the selected cassette about the anchor point defined by the adjacent one of the ridges 192 or 194. This makes the cassettes much more accessible without the need for providing space in a lateral direction between the cassettes themselves. The accessibility of the cassettes for ready removal is accommodated in this fashion. The lateral dimension of the bin and the lateral dimension of the console assembly itself can be reduced. This economy of space makes it feasible for body engineers and designers to provide for the optimum dimensioning of the passenger seat and the driver seat within the restricted confines of the vehicle passenger compartment.

Shown in FIG. 6 is a molded plastic bin 198 having lateral sides 200 and 202 and a rear wall 204. The bin is open at its top. It is intended to cover the base of the structural housing shown in FIG. 6 when it is positioned between the sidewalls 138 and 140.

The bin 198 is accessible when the lower console portion is pivoted about the shaft 118 in a forward direction. It includes a flange 206 that may be secured to the transverse structural member 148 by suitable fastening techniques.

Figure 10:
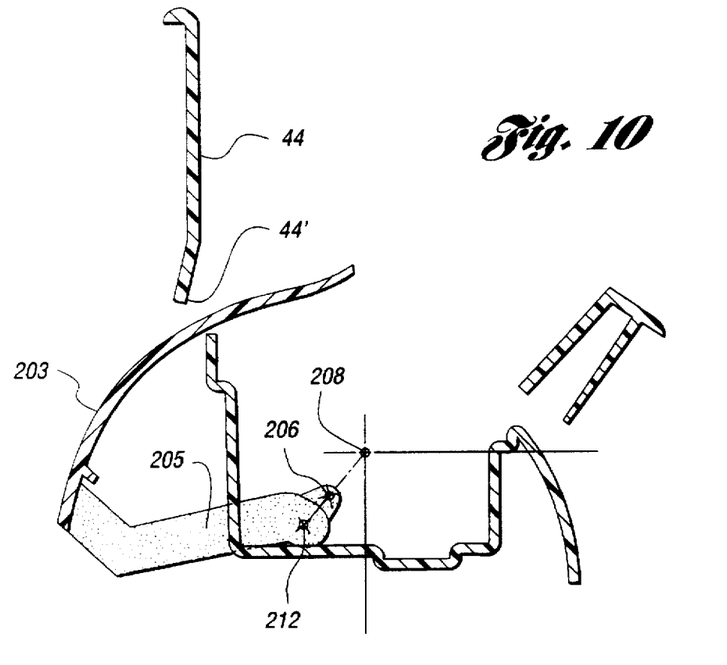
FIG. 10 is a partial cross-sectional view of an ashtray assembly taken on a fore-and-aft plane through the center of the ashtray assembly illustrated in FIG. 9.

FIG. 9 shows an ashtray assembly insert 201 which is generally cup-shaped. It is formed with a generally conical shape so that it nests within the recess of the ashtray housing or well 44' in the plastic shell shown in part at 38 in FIG. 4. An arcuate-shaped cover 203, as seen in FIG. 10, is supported by an arm 205 pivoted at 206. The pivot point at 206 is formed on a stationary pivot element on the conical ashtray housing or well 44', the latter being secured to shaft 118 as indicated in FIG. 9.

Figure 11:
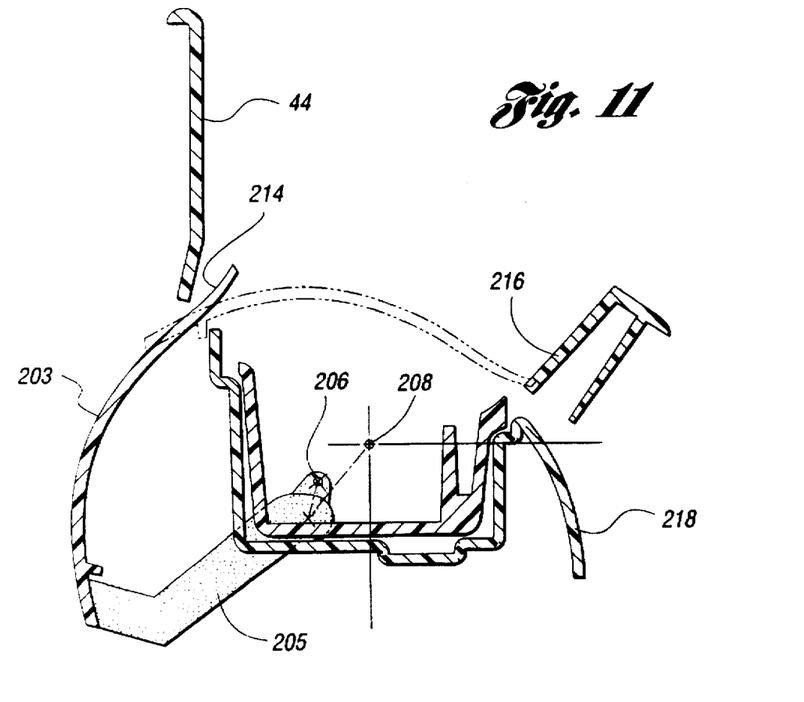
FIG. 11 is a view similar to FIG. 10, but it shows a movable ashtray cover in the position it assumes when an over-center spring returns the ashtray cover to its closed position.
Figure 12:
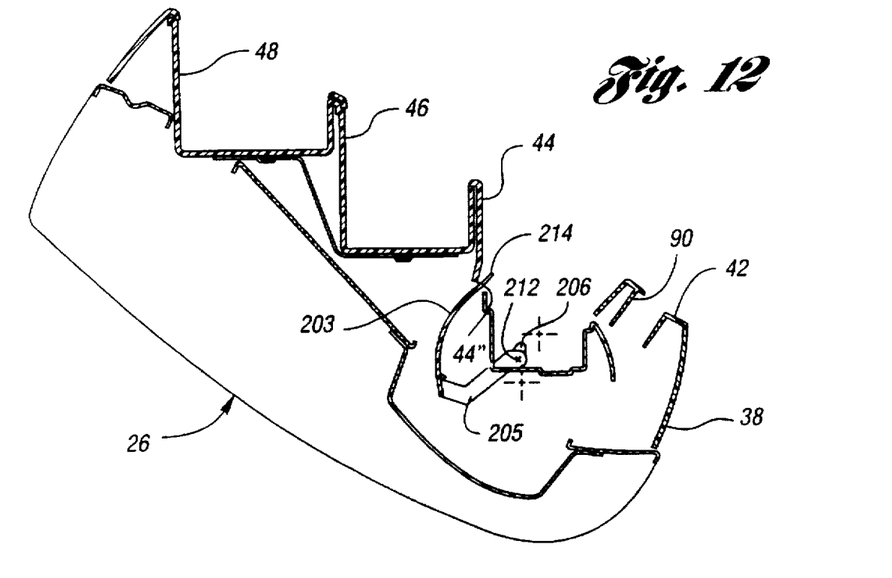
FIG. 12 shows the ashtray cover in the open position by means of phantom lines.
Figure 13:
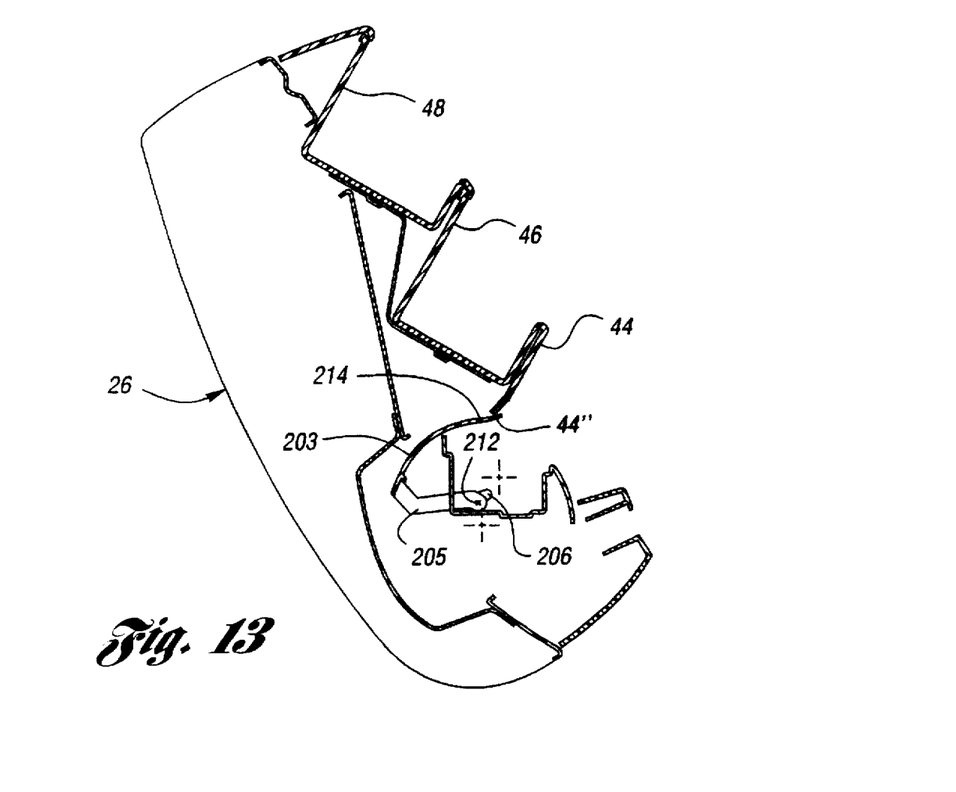

An over-center spring, 209 which is anchored at one end at point 208 in the stationary housing 44', has a movable end 210 joined at point 212 to the arm 205. A tension force between the points 208 and 212 acts on a line of action which, in the view of FIG. 10, passes through pivot point 206. When the cover 203 is moved fully in a clockwise direction, the line of action passes to the right of point 206 thereby causing the cover 203 to be retained in its counter-clockwise position. When the lower console portion is pivoted about the shaft 118 towards its auxiliary seat position, the lower edge 44" of the opening 44 in the plastic housing 38 will engage an upwardly extending lip portion 214 at the leading edge of the pivoted cover 203 as seen in FIG. 11. The cover 203 then will be moved about pivot point 208 in a clockwise direction toward its closed position. As it is moved in a clockwise direction, the line of action of the spring 209 will pass the pivot point 208 and then will exert a closing "snap action" of the cover 203 causing it to assume its fully closed position indicated in full lines in FIG. 11. When it is in its fully closed position, the leading edge 214 will engage the adjacent portion 216 of the wall 38 of the plastic housing.

As seen in FIG. 11, the stationary portion of the ashtray assembly includes a wall 218 which is shaped arcuately, as indicated in FIG. 11, to form a generally continuous covering for the ashtray assembly that is contiguous with the movable cover 203.

This improved ashtray assembly makes it possible to open and close the ashtray cover 203 with a minimal amount of distraction of the vehicle operator. It also makes it possible to close the ashtray assembly with a closure member as the lower console assembly portion is pivoted rearwardly thereby eliminating the possibility of flame propagation within the console assembly after the lower console portion is moved to its auxiliary seat position.

Figure 14:
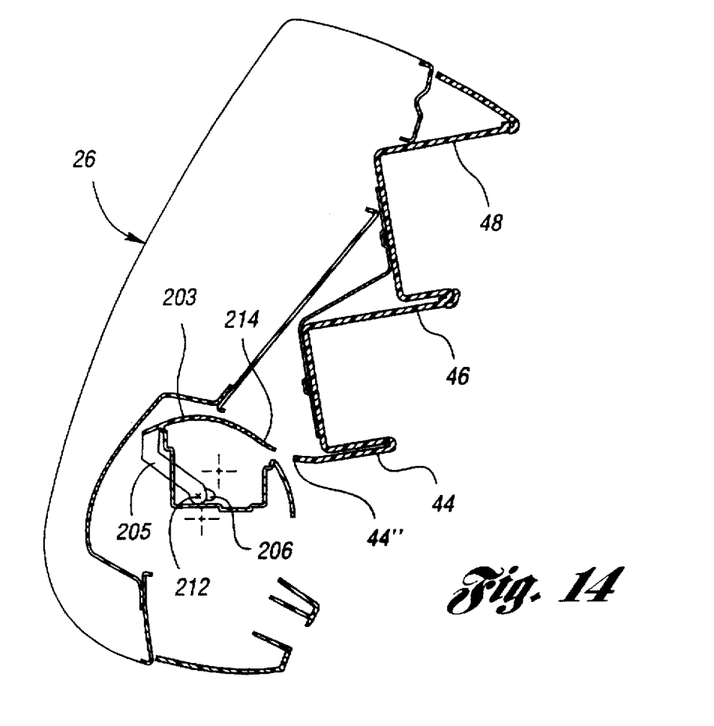
Figure 15:
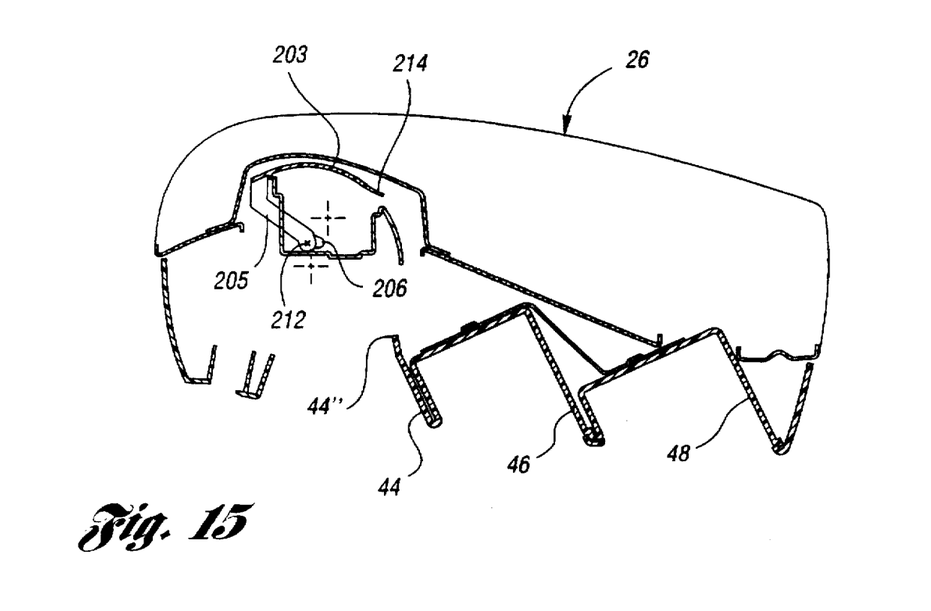

FIGS. 12–15 show various adjusted positions of the console portion 26 as it pivots about its forward pivotal axis. The ashtray cover is engaged by the edge 44" of the opening 44 when the seat portion 26 passes the position shown in FIG. 12. The cover 203 is partially adjusted toward the closed position when the seat portion 26 assumes the position shown in FIG. 13. FIG. 14 shows the cover 204 adjusted to its overcenter position as the seat portion 26 continues to move toward the horizontal position shown in FIG. 15. The cover 203 is fully closed, as seen in FIG. 15, by the spring force.

Having described a preferred embodiment of the invention, what we desire to secure by U.S. Letters Patent is:

What is claimed is:

1. A front seat console assembly for use in a vehicle passenger compartment having independent driver and front passenger seats including a stationary housing:

a lower console portion having a first surface and a second surface mounted pivotally on said housing on a transverse axis, said lower console portion being adjustable to a generally horizontal position whereby said first surface defines an auxiliary seat portion of an auxiliary seat, said auxiliary seat being adjustable forwardly until said second surface is positioned upwardly and said first surface is positioned downwardly;

an ashtray assembly having an ashtray well fixed to said housing below said lower console portion when the latter is adjusted to its generally horizontal position, said ashtray assembly being accessible when said lower console portion is adjusted forwardly;

an upper console portion pivotally mounted on said housing on a second axis spaced rearwardly from and parallel to said transverse axis, said upper console portion forming a generally horizontal armrest when it is adjusted forwardly about said second axis and forming a seat back portion for said auxiliary seat when it is adjusted to a generally upright position;

a rotatable cover for said ashtray well mounted pivotally in said housing about a rotary axis, said rotatable cover, upon being rotated forwardly when said lower console portion is adjusted forwardly, uncovering said ashtray well and covering said ashtray well when it is rotated rearwardly; and a cup retainer structure carried by said lower console portion defining said second surface; said ashtray cover having a closure element therein located in the path of arcuate travel of said cup retainer structure when said lower console portion is adjusted rearwardly whereby said rotatable cover encloses said ashtray well whenever said lower console portion is adjusted rearwardly.

2. The console assembly set forth in claim 1 wherein said rotatable cover includes an over center spring means for maintaining it in its forwardly adjusted position and for exerting a closing force moment thereon when said lower console portion is adjusted toward its rearward position as said closure element is engaged by said cup retainer structure.

3. The console assembly set forth in claim 2 wherein said cup retainer structure defines at least one cup retainer recess and a storage bin in transversely-spaced, close proximity, said cup retainer recess and said storage bin being accessible when said lower console portion is adjusted forwardly.

* * * * *